United States Patent
Wickramasinghe et al.

(10) Patent No.: US 12,338,972 B2
(45) Date of Patent: Jun. 24, 2025

(54) HEATED LENS

(71) Applicant: Rivian IP Holdings, LLC, Irvine, CA (US)

(72) Inventors: Shammika Ashan Wickramasinghe, Banbury (GB); Ellis Robert Guzewich, Costa Mesa, CA (US); Simon Baker, Basingstoke (GB); Vinu Thaliath, Huntington beach, CA (US); Siddharth Ravikumar, Irvine, CA (US); Luis Guillermo Sagastume Pelaez, Fountain Valley, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/338,953

(22) Filed: Jun. 21, 2023

(65) Prior Publication Data
US 2024/0426458 A1    Dec. 26, 2024

(51) Int. Cl.
| F21S 45/60 | (2018.01) |
| B60S 1/02 | (2006.01) |
| F21S 41/20 | (2018.01) |
| H05B 3/14 | (2006.01) |
| H05B 3/84 | (2006.01) |

(52) U.S. Cl.
CPC ............... *F21S 45/60* (2018.01); *B60S 1/026* (2013.01); *F21S 41/28* (2018.01); *H05B 3/145* (2013.01); *H05B 3/84* (2013.01); *H05B 2203/013* (2013.01)

(58) Field of Classification Search
CPC ....... F21S 45/60; F21S 41/28; F21V 23/0442; B60S 1/026; H05B 3/145; H05B 3/84; H05B 2203/013; B60Q 1/04
See application file for complete search history.

(56) References Cited

U.S. PATENT DOCUMENTS

| 8,322,902 | B2 | 12/2012 | Martin et al. |
| 8,789,991 | B2 | 7/2014 | Martin et al. |
| 9,121,566 | B2 | 9/2015 | De Lamberterie |
| 11,019,689 | B2* | 5/2021 | Deering ................ B29C 45/14 |
| 2004/0070339 | A1* | 4/2004 | Suda ..................... H05B 3/145 |
|  |  |  | 313/578 |
| 2006/0011598 | A1* | 1/2006 | Yasuda ................... F21S 45/37 |
|  |  |  | 219/205 |
| 2006/0232972 | A1* | 10/2006 | Mochizuki ............. F21S 41/29 |
|  |  |  | 219/202 |

(Continued)

FOREIGN PATENT DOCUMENTS

| CN | 111810911 | * 10/2020 | ............. F21S 45/60 |
| CN | 114440196 | * 5/2022 | ............... H05B 3/84 |
| DE | 102020121024 | * 2/2020 | ............. F21V 29/90 |

(Continued)

OTHER PUBLICATIONS

JP 2000133017, Takashi Futami, May 12, 2000, English Translation (Year: 2000).*

(Continued)

*Primary Examiner* — Zheng Song
(74) *Attorney, Agent, or Firm* — Foley & Lardner LLP

(57) ABSTRACT

A system is provided. The system can include a lens. The lens can include a carbon nanotube layer. The carbon nanotube layer can be configured to thermally couple with a heating element.

19 Claims, 9 Drawing Sheets

(56) References Cited

U.S. PATENT DOCUMENTS

2020/0271295 A1\* 8/2020 Miu .................. F21S 41/29

FOREIGN PATENT DOCUMENTS

| EP | 2 161 494 B1 | | 11/2011 | | |
|----|----|----|----|----|----|
| EP | 2 792 940 B1 | | 9/2016 | | |
| EP | 2 098 774 B1 | | 7/2020 | | |
| JP | H-09127209 | \* | 6/1995 | ............. | F21S 45/60 |
| JP | H10312705 | \* | 11/1998 | ............. | H05B 3/20 |
| JP | 2000133017 | \* | 5/2000 | ............. | F21S 41/26 |
| JP | 2006032137 A | \* | 2/2006 | ............. | F21S 48/34 |
| WO | WO-2013092253 A1 | \* | 6/2013 | ............. | B60S 1/026 |

OTHER PUBLICATIONS

DE 102020121024, Klaus Kratschmann, Feb. 10, 2022, English Translation (Year: 2022).\*
CN 114440196, Takashi Furui, May 6, 2022, English Translation (Year: 2022).\*
CN 111810911, Chen et al., Oct. 23, 2020, English Translation (Year: 2020).\*

\* cited by examiner

HEATED LENS

INTRODUCTION

A vehicle, such as an electric vehicle, can include one or more lamps. The lamps can be used to aid a driver in viewing areas of the environment surrounding the vehicle.

SUMMARY

This disclosure is generally directed to a lens of a vehicle that can be heated. Snow, ice, or generally moisture or precipitation can accumulate on a lamp outer lens. The moisture can impact the light output of the lamp. A film heater can be added to the lamp outer lens. The film heater can be or include carbon nanotubes (e.g., a transparent carbon nanotube film layer). The carbon nanotube can be surrounded by a heating element (e.g., silver bus bars). The carbon nanotubes can conduct current. Conducting the current can heat up the carbon nanotube layer to remove snow, ice, or other moisture or precipitation build up on the lens.

A system is provided. The system can include a lens. The lens can include a carbon nanotube layer. The carbon nanotube layer can be configured to thermally couple with a heating element.

At least one aspect is directed to a system. The system can include a lens. The lens can include a carbon nanotube layer. The system can include a heating element. The heating element can heat the carbon nanotube layer.

At least one aspect is directed to a system. The system can include a lens. The lens can include a carbon nanotube layer. The system can include a controller. The controller can heat the carbon nanotube layer. The controller can heat the carbon nanotube layer by controlling a battery coupled with the carbon nanotube layer.

A vehicle is provided. The vehicle can include a lens. The lens can include a carbon nanotube layer. The carbon nanotube layer can be configured to thermally couple with a heating element.

At least one aspect is directed to a vehicle. The vehicle can include a lens. The lens can include a carbon nanotube layer. The vehicle can include a heating element. The heating element can heat the carbon nanotube layer.

At least one aspect is directed to a method. The method can include monitoring, by a processor, a condition. The method can include determining, by the processor, satisfaction of the condition. The method can include, responsive to the satisfaction of the condition, heating, by the processor, a carbon nanotube layer of a lens.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
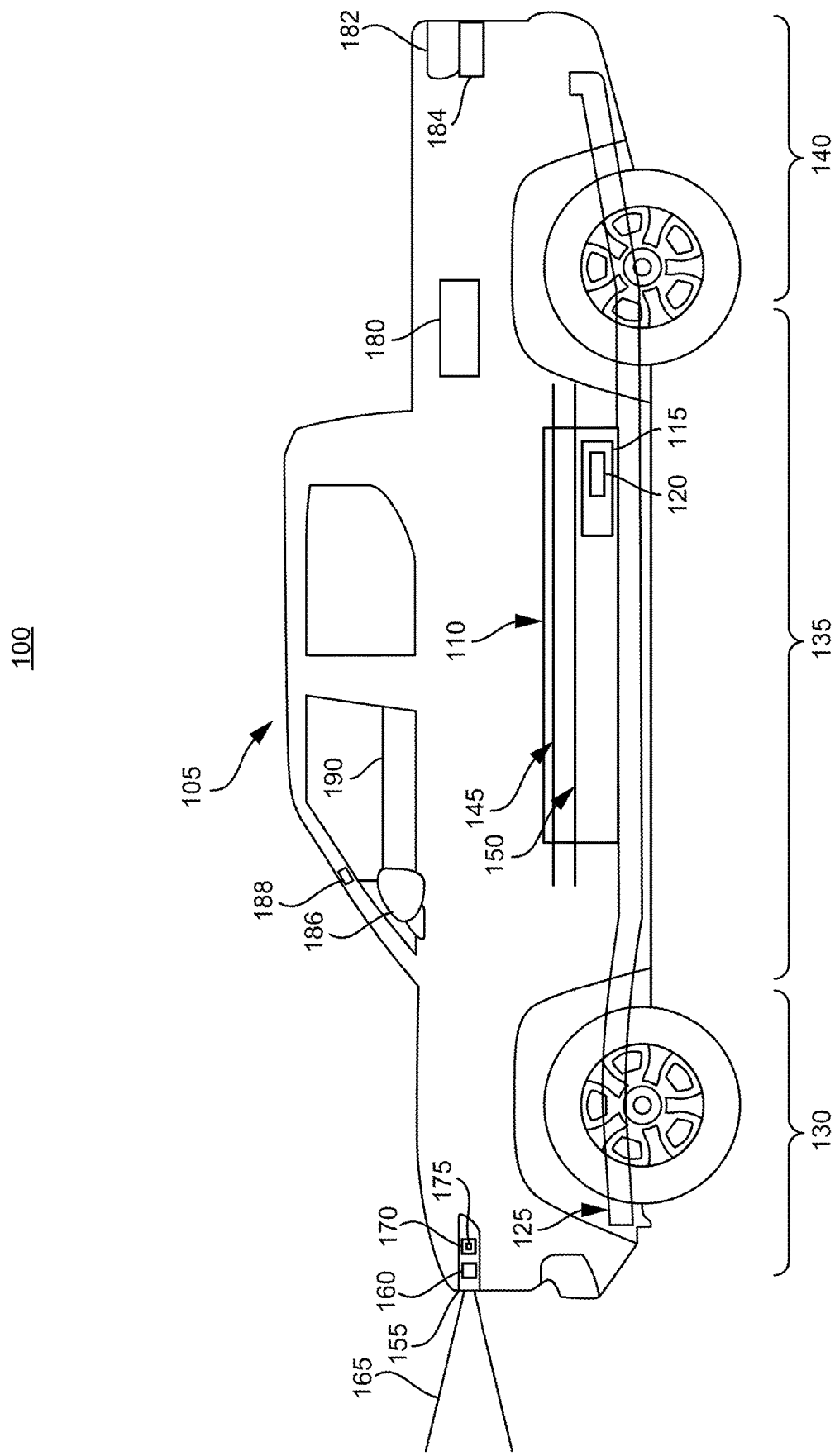
FIG. 1 depicts an example vehicle, in accordance with some implementations.

Following below are more detailed descriptions of various concepts related to, and implementations of, methods, apparatuses, and systems of heating vehicle lenses. The various concepts introduced above and discussed in greater detail below may be implemented in any of numerous ways.

In an automotive system, different lamps can be used to illuminate the environment. The lamps can illuminate the environment at night and in otherwise dark environments (e.g., in foggy environments or tunnels). The lamps can do so to enable a driver of a vehicle to see the environment or for sensors of the vehicle to collect data. The lamps may be protected by transparent barriers (e.g., polycarbonate lenses) through which the lamps can direct light.

In some cases, precipitation (e.g., snow, ice, rain, or mist) from the environment can build up on lenses of lamps on vehicles. The precipitation can block or otherwise reduce illumination by the lamps. This problem can be compounded with light-emitting diode (LED) lamps, which can produce less heat than halogen lamps and are therefore more susceptible to snow and ice accumulation. Conventional systems and methods to resolve this problem can involve placing wires on the lenses and running current through the wires to heat up the lenses. However, the wires can further obstruct the light emitted from the lamps from the environment.

To solve these and other technical challenges, a lens of a system (e.g., an automotive system) can include a carbon nanotube layer. The carbon nanotube layer can be or include a carbon nanotube film layer. The carbon nanotube layer can be placed between layers of other material (e.g., polycarbonate) of the lens. The system can also include a heating element (e.g., a wire that can conduct current or a busbar, such as a silver busbar). The heating element can be coupled to or otherwise contact the carbon nanotube layer. The heating element can direct current through the heating element to the carbon nanotube layer. Directing current through the heating element can cause current to travel through the carbon nanotube layer. The current can heat the carbon nanotube layer. Heating the carbon nanotube layer can heat the layers of the lens surrounding the carbon nanotube layer. Heating the layers surrounding the carbon nanotube layer can cause any precipitation built up on the lens to dissipate or otherwise slide off of the lens. The carbon nanotube layer can be the lens itself or an outer layer of the lens. In such cases, heating the carbon nanotube layer to melt or cause precipitation built up on the carbon nanotube layer to dissipate. Accordingly, the carbon nanotube layer can facilitate removal of precipitation obstruction on the lens.

The lens of the system can be a lens of a headlamp of a vehicle. For example, a vehicle can include a headlamp. The headlamp can include a bulb that emits light toward the front of the vehicle and a lens that includes a carbon nanotube layer. The light can increase visibility in front of the vehicle during the night or in foggy environments. When precipitation builds up on the lens of the headlamp, the light can be blocked by the precipitation. By heating the heating elements coupled with the carbon nanotube layer of the headlamp, the carbon nanotube layer can transfer heat to the other layers of the headlamp. The heat transfer can cause the precipitation to dissipate or slide off of the lens, thus causing the headlamp to emit light unobstructed. Because the carbon nanotube layer can be translucent or transparent, the carbon nanotube layer may not obstruct the light from the headlamp. Thus, the carbon nanotube layer can remove precipitation obstructing light from headlamps without obstructing the light.

A controller can selectively heat a carbon nanotube layer of a lens. For example, the controller can monitor a condition. The condition can be a rule indicating whether to heat the carbon nanotube layer of the lens. An example of a condition can be a threshold or a particular reading from a sensor (e.g., a reading indicating it is snowing or otherwise precipitating in the environment surrounding a vehicle or there is precipitation on the lens). Responsive to determining a condition is satisfied, the controller can heat the carbon nanotube layer of the lens. The controller can heat the carbon nanotube layer by transmitting a control signal (e.g., to a battery). The control signal can cause the battery to discharge or direct current or energy through a heating element to the carbon nanotube layer. Accordingly, the controller can determine when to heat the carbon nanotube layer or lens.

A carbon nanotube layer can be used to heat any lenses or surfaces of a vehicle. For example, a carbon nanotube layer can be integrated into lenses of a windshield, windows, mirrors (e.g., side-view mirror or rear-view mirrors), a shell of the vehicle, or any other component where heating is desired.

FIG. 1 depicts an example cross-sectional view 100 of a vehicle 105 installed with at least one battery pack 110. The vehicle 105 can be an electric vehicle. The vehicle 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. The vehicles 105 can be fully electric or partially electric (e.g., plug-in hybrid) and further, vehicles 105 can be fully autonomous, partially autonomous, or unmanned. The vehicles 105 can also be human operated or non-autonomous. The vehicles 105 such as electric trucks or automobiles can include on-board battery packs 110, batteries 115 or battery modules 115, or battery cells 120 to power the electric vehicles. The vehicle 105 can include a chassis 125 (e.g., a frame, internal frame, or support structure). The chassis 125 can support various components of the vehicle 105. The chassis 125 can span a front portion 130 (e.g., a hood or bonnet portion), a body portion 135, and a rear portion 140 (e.g., a trunk, payload, or boot portion) of the vehicle 105. The battery pack 110 can be installed or placed within the vehicle 105. For example, the battery pack 110 can be installed on the chassis 125 of the vehicle 105 within one or more of the front portion 130, the body portion 135, or the rear portion 140. The battery pack 110 can include or connect with at least one busbar (e.g., a current collector element). For example, the first busbar 145 and the second busbar 150 can include electrically conductive material to connect or otherwise electrically couple the battery 115, the battery modules 115, or the battery cells 120 with other electrical components of the vehicle 105 to provide electrical power to various systems or components of the vehicle 105.

The vehicle 105 can include one or more headlamps 155. The one or more headlamps 155 can include one or more light bulbs 160 (e.g., halogen light bulbs or light-emitting diode (LED) light bulbs). The one or more headlamps 155 can be located in front of (e.g., in the direction the vehicle 105 drives forward and not in reverse) the vehicle 105 or in any other location on the vehicle 105. The one or more headlamps 155 can direct light 165 away from the front of the vehicle 105. The one or more headlamps 155 can include one or more lenses 170. Each or a subset of the headlamps 155 can include a lens 170. The lens 170 can include a carbon nanotube layer 175. The carbon nanotube layer 175 can be heated to heat the lens 170. By heating the lens 170, precipitation on the lens 170 can dissipate or otherwise be removed from the lenses 170. Accordingly, the carbon nanotube layer 175 can be used to facilitate precipitation removal from the one or more headlamps 155. The lens 170 can be integrated into the vehicle 105 as a lens of one or more of the headlamp 155, a tail light 182, a turn signal 184, a mirror 186, a windshield 188, or a window 190.

The vehicle 105 can include sensors 180. The sensors 180 can be located at any location on the vehicle 105. The sensors 180 can include one or more sensors. The sensors 180 can be, for example, pressure sensors, moisture sensors, humidity sensors, thermometers, cameras, video recorders, light detection and ranging (LiDAR) sensors, sonar sensors, or ultrasonic sensors. The sensors 180 can be configured to detect various environmental characteristics, such as, for example, temperature, humidity, air pressure, snow, rain, ice, and wind speed. The sensors 180 can be located on the vehicle 105. For example, the sensors 180 can be locate in, on, or around the lenses 170, the windshield 188 of the vehicle 105, or at any other location of the vehicle 105. The sensors 180 can detect environmental characteristics around the vehicle 105. The sensors 180 can transmit the collected characteristics to a computer of the vehicle 105. The computer can process the data for vehicle control.

Figure 2:
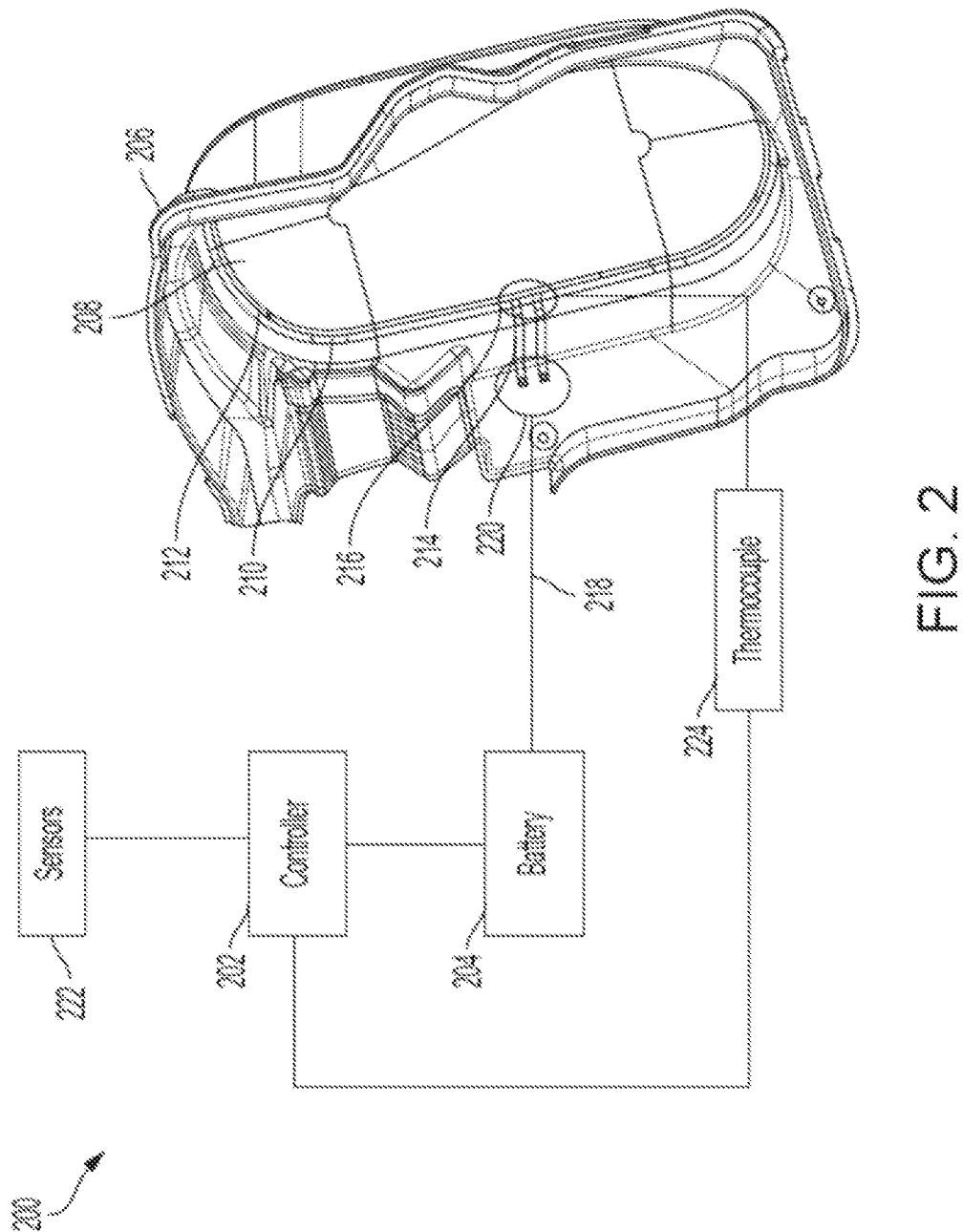
FIG. 2 depicts an example system for heating a lens, in accordance with some implementations.

FIG. 2 depicts an example system 200 for heating a lens. The system 200 can include a controller 202, a battery 204, and a headlamp 206. The components 202-206 of the system 200 can be components of a vehicle (e.g., the vehicle 105). The components 202-206 can operate together to direct light from the vehicle or remove or substantially minimize precipitation or other obstructions from the headlamp 206. For example, the headlamp 206 can include a lens 208. The lens 208 can include a carbon nanotube layer 210. The battery 204 can be coupled with the carbon nanotube layer 210. The controller 202 can send, transmit, or direct a control signal to the battery 204. The control signal can cause the battery 204 to direct current through the carbon nanotube layer 210. The current can increase the temperature of the carbon nanotube layer 210. The increase in temperature of the carbon nanotube layer 210 can increase the temperature of the lens 208. Accordingly, the carbon nanotube layer 210 can facilitate an increase in temperature of the lens 208.

The lens 208 can be integrated into a vehicle. For example, the lens 208 can be integrated into a headlamp, mirror, taillights, daytime running lights, fog lights, signal lights, brake lights, hazard lights, driving lamps, windshield, or other surface (e.g., outer surface) of the vehicle. The lens 208 can be or include a transparent or translucent material. The transparent or translucent material can facilitate light passing through the lens 208. In an example, the lens 208 can be the outer surface of a headlamp of a vehicle that protects the headlamp from the environment while allowing the headlamp to direct light in front of the vehicle. The lens 208 can be integrated into any surface or component of the vehicle.

The lens 208 can include the carbon nanotube layer 210 and a layer 212. The layer 212 can be or include a translucent or transparent material, such as polycarbonate or glass. The carbon nanotube layer 210 can be coupled with the layer 212 (e.g., formed underneath the layer 212 relative to an outer surface of the lens 208). The carbon nanotube layer 210 can be coupled between the layer 212 and another layer (not shown). The other layer can be or include the same material as the layer 212. The carbon nanotube layer 210 can be coupled along an entirety of the layer 212 or coupled with a portion (e.g., less than an entirety) of the layer 212. In one example, the carbon nanotube layer 210 can be coupled with a portion of the layer 212 in front of (e.g., only in front of) a low-beam light of the headlamp 206 of the vehicle.

The carbon nanotube layer 210 can be or include a layer or coating that includes a single or multiple layers of carbon nanotubes (e.g., aligned carbon nanotubes). The carbon nanotube layer 210 can be deposited on a substrate within the lens 208 using various methods, such as chemical vapor deposition, spin coating, or spray coating. The carbon nanotube layer 210 can have a thickness in the range of nanometers to micrometers, for example.

The carbon nanotube layer 210 can be or include a carbon nanotube film layer. The carbon nanotube film layer can be or include a network of randomly oriented carbon nanotubes. This film can be produced by various methods such as filtration of a carbon nanotube suspension or transfer printing from a carbon nanotube forest. The thickness of the carbon nanotube film layer can range from tens to hundreds of micrometers.

The carbon nanotube layer 210 can be transparent or translucent. The carbon nanotube layer 210 can be translucent or transparent because the carbon nanotube layer 210 is or includes one or more carbon nanotubes. Because the carbon nanotube layer 210 can be transparent or translucent, light can pass through the carbon nanotube layer 210 or the lens 208 of which the carbon nanotube layer 210 is a part. Accordingly, when integrated into the headlamp 206, the lens 208 with the carbon nanotube layer 210 may not block or stop light from passing through the lens 208. The lens 208 can allow light to pass through while protecting the headlamp 206 from the environment.

The carbon nanotube layer 210 can be thermally coupled with a heating element 214 (e.g., the carbon nanotube layer 210 can be coupled with the heating element 214 such that the heating element 214 causes a change in temperature in the carbon nanotube layer 210). The heating element 214 can contact the carbon nanotube layer at one or more locations. In some cases, the heating element 214 can lay flush with the carbon nanotube layer 210. The heating element 214 can be or include one or more busbars (e.g., silver busbars), wires, or other conductors (e.g., thermal conductors). The heating element 214 can be configured to conduct current or electricity to the carbon nanotube layer 210. The heating element 214 can be coupled to the carbon nanotube layer 210 through one or more contact points 216. The heating element 214 can be configured to carry or conduct current to the contact points 216. Current can travel from the contact points 216 throughout the carbon nanotube layer 210. The current can cause the carbon nanotube layer 210 to heat up or increase in temperature. The increase in temperature of the carbon nanotube layer 210 can heat up the layer 212 (e.g., through a heat transfer). Accordingly, the current traveling through the heating element 214 and through the carbon nanotube layer 210 can cause the layer 212 to heat up or increase in temperature. The carbon nanotube layer 210 can provide uniform heat distribution across the surface of the lens 208 (e.g., at the surface of the lens 208 that the carbon nanotube layer 210 contacts).

The battery 204 can be a battery of a vehicle (e.g., the vehicle 105). The battery 204 can be or include a power source. The battery 204 can have a high voltage or a low voltage. The battery 204 can be a high voltage battery with a voltage of 400 volts (V) or otherwise a voltage in the range of 300V to 800V, for example. The battery 204 can be a low voltage battery with a voltage of 12V or a voltage within the range of 5V to 20V, for example. The battery 204 can be or include a high voltage battery and a low voltage battery (e.g., a high voltage battery connected in series with a low voltage battery). The battery 204 can be connected with the heating element 214 through wires 218 at one or more contact points 220 of the heating element 214.

The battery 204 can direct current to the heating element 214 and the carbon nanotube layer 210. For example, the battery 204 can discharge current or energy to the contact points 220 of the heating element 214 through the wires 218. The current or energy can travel through the wires 218 to the contact points 220, through the heating element 214 to the contact points 216, and to or through the carbon nanotube layer 210. The current or energy can modify heat (e.g., increase or reduce the temperature) of the carbon nanotube layer 210 or the lens 208. Thus, the battery 204 can heat up the carbon nanotube layer 210 or the lens 208.

The controller 202 can include or execute on one or more processors or computing devices. The controller 202 can be located on (e.g., be electrically connected to the circuitry of) a vehicle (e.g., the vehicle 105). The controller 202 can be remote from the vehicle. The controller 202 can communicate with components of the vehicle over a network (e.g., a wireless network or a wired network). The controller 202 can include hardware elements, such as one or more processors, logic devices, circuits, or memory.

The controller 202 can control the discharge of current or energy of the battery 204. For example, the controller 202 can be coupled (e.g., communicatively coupled) with the battery 204. The controller 202 can transmit control signals to the battery 204. The control signals can cause the battery 204 to discharge or stop discharging energy or current to the heating element 214 and the lens 208 (e.g., the controller 202 can control the heating element 214 by discharging energy or current from the battery 204 to or through the heating element 214). The controller 202 can transmit a first control signal to the battery 204 to cause the battery 204 to discharge energy through the wires 218 to the heating element 214 and the carbon nanotube layer 210. The controller 202 can transmit a second control signal (e.g., after transmitting the first control signal) to the battery 204 to stop the battery from discharging energy or current to the heating element 214 and carbon nanotube layer 210. Thus, the controller 202 can control heating of the carbon nanotube layer 210.

The controller 202 can monitor the environment surrounding the vehicle on which the controller 202 is located. For example, the controller 202 can monitor different characteristics of the environment surrounding the vehicle. Examples of such characteristics can include the temperature, humidity, moisture (e.g., humidity in the air), precipitation (e.g., snow, rain, or ice) and wind speed. The controller 202 can monitor the characteristics by receiving or polling sensors 222 (e.g., the sensors 180) of the vehicle for values. The sensors 222 can transmit or send the values of the characteristics the sensors respectively monitor to the controller 202. The controller 202 can receive and process the values. Based on the values, the controller 202 can determine whether to discharge energy or current from the battery 204 to the carbon nanotube layer 210.

The controller 202 can determine whether to discharge energy or current from the battery 204 to the carbon nanotube layer 210 based on values of characteristics of the environment that the controller 202 receives from the sensors 222. For instance, the controller 202 can compare the values to one or more conditions (e.g., conditions stored in memory). The conditions can include rules or thresholds. The controller 202 can determine a condition is satisfied based on a value of a characteristic satisfying the rule or threshold of the condition. In some cases, the controller 202 can determine a condition is satisfied responsive to detecting moisture in the environment surrounding the vehicle. Responsive to determining a condition is satisfied or responsive to satisfaction of a condition, the controller 202 can determine to discharge the battery 204 to modify heat of the carbon nanotube layer 210 (e.g., determine to control the heating element 214 to modify heat of the carbon nanotube layer 210).

For example, the controller 202 can compare a value indicating an amount of moisture in the environment surrounding the vehicle to a threshold. Responsive to determining the value indicating the amount of moisture exceeds the threshold, the controller 202 can determine the threshold or a condition is satisfied. Responsive to determining the threshold or condition is satisfied, the controller 202 can transmit a control signal to the battery 204 to cause the battery 204 to discharge energy or current to the carbon nanotube layer 210.

In another example, the controller 202 can detect that the weather surrounding the vehicle is rain or snow. Responsive to detecting the rain or snow weather, the controller 202 can determine a condition is satisfied. The controller 202 can transmit a control signal to the battery 204 to cause the battery 204 to discharge energy or current to the carbon nanotube layer 210. The controller 202 can determine any number of conditions are satisfied based on readings from the sensors 222 and control discharge of the battery 204 accordingly.

The controller 202 can discharge energy or current from the battery 204 to the carbon nanotube layer 210 based on characteristics of a surface of the vehicle. For example, the controller 202 can receive data from the sensors 222 indicating there is an amount of pressure at the surface of the vehicle exceeding a threshold or that there is moisture or precipitation on a surface of the vehicle. Such readings can indicate, for example, that there is rain or snow on the vehicle. The controller 202 can compare the readings to conditions in memory. The controller 202 can determine one or more conditions are satisfied based on the readings. Responsive to determining the one or more conditions are satisfied, the controller 202 can transmit a control signal to the battery 204 to cause the battery 204 to discharge energy or current to the carbon nanotube layer 210. The controller 202 can determine any number of conditions are satisfied based on readings from the sensors 222 and control discharge of the battery 204 accordingly.

The controller 202 can discharge energy or current from the battery 204 to the carbon nanotube layer 210 based on conditions that include rules that are not related to characteristics of the surface of the vehicle or the environment surrounding the vehicle. For example, a condition can be satisfied at a current time of the day, a state of the vehicle (e.g., the vehicle is on or is traveling at a certain velocity), when a defined manual input is received, a change in state of the vehicle (e.g., when the vehicle turns on) or any other rule. Conditions can be configured by a user. The controller 202 can determine when such conditions are satisfied and discharge energy or current from the battery 204 responsive to the satisfaction of the conditions.

The controller 202 can cause varying levels of discharge of the battery 204 based on the conditions that are satisfied. For example, the conditions can have a stored association in memory of the controller 202 with percentages or values of energy or current discharge from the battery 204. The controller 202 can determine a condition is satisfied and identify a percentage or value that has a stored association with the satisfied condition. The controller 202 can transmit a control signal to the battery 204 to cause the battery 204 to discharge the identified percentage or amount of current (e.g., a defined amperage) or energy to the carbon nanotube layer 210. The controller 202 can transmit a control to the battery 204 to cause the battery 204 to discharge the current or energy at a defined voltage. Such can be useful for energy savings, for example. Satisfaction of different conditions can indicate the carbon nanotube layer 210 needs to be heated to varying temperatures (e.g., a snowy environment can correspond to a higher temperature than a rainy environment). Controlling the energy or current discharge of the battery 204 can enable the controller 202 to control the temperature of (e.g., modify heat of) the carbon nanotube layer 210.

The controller 202 can monitor the temperature of the carbon nanotube layer 210 or the layers of the lens 208 surrounding the carbon nanotube layer 210. For example, a thermocouple 224 can be coupled with the carbon nanotube layer 210. The thermocouple 224 can be coupled with the carbon nanotube layer 210 at the contact points 216, at any other location of the carbon nanotube layer 210, or at the heating element 214. The thermocouple 224 can be used to monitor the temperature of the carbon nanotube layer 210. For example, the thermocouple 224 can measure the temperature at the contact points 216 or at any other points of the carbon nanotube layer 210. The thermocouple 224 can additionally or instead measure the temperature of the layers (e.g., the layer 212) surrounding the carbon nanotube layer 210. The thermocouple 224 can do so by measuring a temperature-dependent voltage at the contact points 216 or at the points of the carbon nanotube layer 210 or other layers to which the thermocouple 224 is coupled. The thermocouple 224 can transmit the measured temperature or temperature-dependent voltage to the controller 202. The thermocouple 224 can transmit the measurements to the controller 202 periodically over time or upon receipt of a request for measurements from the controller 202. The controller 202 can receive or read the temperature (e.g., the measured or monitored temperature) or temperature-dependent voltage. The controller 202 can determine whether to adjust current or energy discharge of the battery 204 (e.g., determine how to control the heating element 214) based on the temperature or temperature-dependent voltage.

In another example, other temperature sensors can be used to measure the temperature of the carbon nanotube layer 210 or the lens 208. Such temperature sensors can measure the temperature and transmit the measurements to the controller 202. Accordingly, the controller 202 can monitor the temperature of the carbon nanotube layer 210 via the thermocouple 224 or other temperature sensors.

The controller 202 can control the discharge of energy or current of the battery 204 based on the temperature measurements the controller 202 receives. For example, the controller 202 can store a temperature (e.g., a defined or predetermined temperature). The temperature can be a target temperature or a setpoint. The controller 202 can discharge energy or current from the battery 204 to the carbon nanotube layer 210. Energy or current can cause the carbon nanotube layer 210 or the layers (e.g., the layer 212) of the lens 208 surrounding the carbon nanotube layer 210 to heat up or increase in temperature or decrease in temperature. The controller 202 can poll or receive temperature measurements from the thermocouple 224 or another temperature sensor for the carbon nanotube layer 210 or the layers of the lens 208 surrounding the carbon nanotube layer 210. The controller 202 can compare the received temperatures to the target temperature as the controller 202 receives the temperatures. Upon receiving a temperature that matches or exceeds the target temperature, the controller 202 can transmit a control signal to the battery 204 to stop or reduce discharge of energy or current from the battery 204. Accordingly, the controller 202 can heat the carbon nanotube layer 210 and the lens 208 while avoiding overheating the carbon nanotube layer 210 or the lens 208. The controller 202 can do so while conserving energy resources of the battery 204.

The controller 202 can transmit a control signal to the battery 204 to cause the battery 204 to discharge energy or current to the carbon nanotube layer 210 to remain at the target temperature (e.g., remain at the target temperature for a predetermined amount of time or until detection of an event that indicates to stop discharging energy or current to the carbon nanotube layer 210). For example, the controller 202 can receive measurements of temperature from the thermocouple 224 or temperature sensor over time. The controller 202 can compare the measurements to the target temperature. Responsive to determining the temperature is below the target temperature, the controller 202 can transmit a control signal to the battery 204 to discharge more energy or current to the carbon nanotube layer 210. Responsive to determining the temperature is at or above the target temperature, the controller 202 can transmit a control signal to the battery 204 to stop or reduce energy or current discharge from the battery 204.

The target temperature can vary depending on the condition that the controller 202 determines is satisfied. For example, conditions can have stored associations in memory of the controller 202 with different target temperatures for the carbon nanotube layer 210 or the lens 208. The controller 202 can determine a condition is satisfied and identify a target temperature based on the target temperature having a stored association with the satisfied condition in memory. The controller 202 can transmit a control signal to the battery 204 to cause the battery 204 to discharge current or energy to the carbon nanotube layer 210. The controller 202 can receive temperature measurements for the carbon nanotube layer 210 or the lens 208. The controller 202 can compare the received temperature measurements to the identified target temperature. Upon determining the carbon nanotube layer 210 or the lens 208 is at the target temperature, the controller 202 can transmit a control signal to the battery 204 to stop discharging energy to the carbon nanotube layer 210 or to maintain the target temperature.

The controller 202 can transmit a control signal to the battery 204 to cause the battery 204 to discharge energy or current to the carbon nanotube layer 210 for a predetermined amount of time. For example, the controller 202 can store a predetermined amount of time in memory. Upon determining a condition is satisfied, the controller 202 can transmit a control signal to the battery 204 to cause the battery to discharge energy or current to the carbon nanotube layer 210 for the predetermined amount of time or for the carbon nanotube layer 210 or the lens 208 to remain at a target temperature for the predetermined amount of time. For instance, the controller 202 can determine a condition is satisfied responsive to determining a vehicle has turned on or is has entered a pre-heating state. Responsive to determining the condition is satisfied, the controller 202 can control the battery 204 to discharge energy or current to the carbon nanotube layer 210 for a predetermined amount of time and then stop discharging energy or current. The controller 202 can cause the battery 204 to stop discharging energy responsive to determining the vehicle has changed to a driving state. Accordingly, the controller 202 can limit the amount of energy the battery 204 uses to heat the carbon nanotube layer 210.

The predetermined amount of time can vary depending on the condition that the controller 202 determined to be satisfied. For example, the controller 202 can store associations between different predetermined amounts of time and conditions in memory. Responsive to determining a condition is satisfied, the controller 202 can identify the predetermined amount of time that has a stored association with the satisfied condition in memory. Accordingly, the controller 202 can selectively control the amount of energy that is used to modify heat of the carbon nanotube layer 210.

For example, the controller 202 can receive measurements of temperature from a thermocouple or temperature sensor over time. The controller 202 can compare the measurements to the target temperature. Responsive to determining the temperature is below the target temperature, the controller 202 can transmit a control signal to the battery 204 to discharge more energy or current to the carbon nanotube layer 210. Responsive to determining the temperature is at or above the target temperature, the controller 202 can transmit a control signal to the battery 204 to stop or reduce energy or current discharge from the battery 204.

The controller 202 can transmit a control signal to the battery 204 to cause the battery 204 to discharge energy or current to the carbon nanotube layer 210 until detecting an event. For example, the controller 202 can store different events in memory. Examples of stored events can be determining the temperature of the carbon nanotube layer 210 or the lens 208 reached a target temperature (e.g., based on a temperature measurement from the thermocouple 224), the vehicle has switched into a drive gear, mode or state, a predetermined amount of time has ended, no moisture or precipitation is detected by a sensor (e.g., no moisture or precipitation is detected in the environment, on the surface of the vehicle, or on the surface of the lens 208), or for a predetermined amount of time. Upon determining satisfaction of an event, the controller 202 can transmit a control signal to the battery 204 to stop discharging current or energy to the carbon nanotube layer 210.

Figure 3:
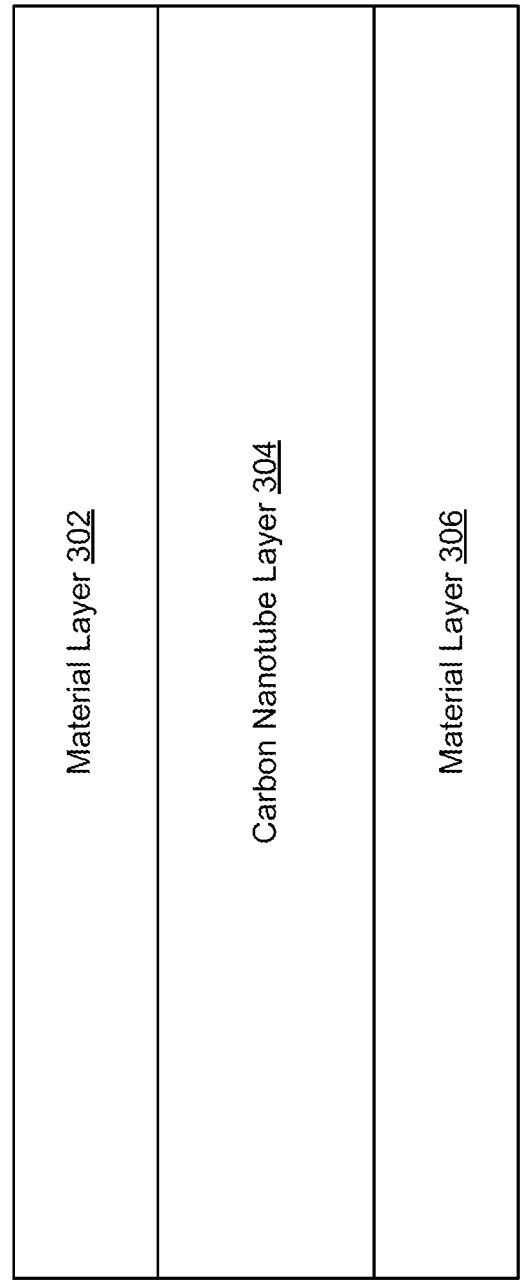
FIG. 3 depicts an example lens, in accordance with some implementations.

FIG. 3 depicts an example lens 300, in accordance with some implementations. FIG. 3 depicts a cross-sectional view of the lens 300. The lens 300 can be the same as or similar to the lens 208. The lens 300 can include a material layer 302, a carbon nanotube layer 304, and a material layer 306. Each of the layers 302-306 can have any density or thickness. The material layer 302 can be a first layer of a material. The material layer 306 can be a second layer of a material. The material layers 302 and 306 can each be or include a transparent or translucent material. Examples of such a transparent or translucent material can include polycarbonate, glass, acrylic, polymethal methacrylate, and xenoy. The material layer 302 and 306 can be or include the same material or different materials. In one example, the material layer 302 can be a first layer of polycarbonate and the material layer 306 can be a second layer of polycarbonate. The lens 300 can include only a single material layer 302 or 306 on or coupled with the carbon nanotube layer 304. The carbon nanotube layer 304 can be between the material layers 302 and 306. The carbon nanotube layer 304 can be a layer of one or more carbon nanotubes. The layers 302-306 can be transparent or translucent to facilitate light passing through the lens 300, such as light of a headlamp directed away from a vehicle to improve visibility. The carbon nanotube layer 304 can modify heat of the material layer 302 or the material layer 306 by conducting current from a heating element (e.g., the heating element 214).

The carbon nanotube layer 304 can be attached or coupled to all or a portion of the material layer 302 or the material layer 306. For example, the carbon nanotube layer 304 can only be coupled to a portion of the material layer 302 or the material layer 306. Such can be advantageous, for example, to reduce costs of parts or to reduce the weight of the lens 300. The carbon nanotube layer 304 can be coupled to any percentage or portion of the material layer 302 or the material layer 306.

The carbon nanotube layer 304 can vary in density or thickness at different locations of the lens 300. For example, different portions of the carbon nanotube layer 304 can have higher density (e.g., number of carbon nanotubes in a particular area or volume of the carbon nanotube layer 304) or thickness, such as at locations of the lens 300 through which light is configured to pass through (e.g., as coupled to a vehicle or other components of a headlamp). Other portions of the carbon nanotube layer 304 can have a lower density or thickness, such as at areas through which light is not configured to pass. For example, the area of the lens 300 through which a low-beam light of a headlamp is configured to pass can have a higher density carbon nanotube layer 304 than other portions of the lens 300. The higher density or thickness of the carbon nanotube layer 304 can facilitate faster heating of the lens 300 at the areas contacting the higher density or thickness portions. The carbon nanotube layer 304 can be one or more sheets of carbon nanotubes. The carbon nanotube layer 304 can cover the entire surface of the lens 300 or more or less than a substantial portion (e.g., more or less than 50%) of the lens 300.

Figure 4:
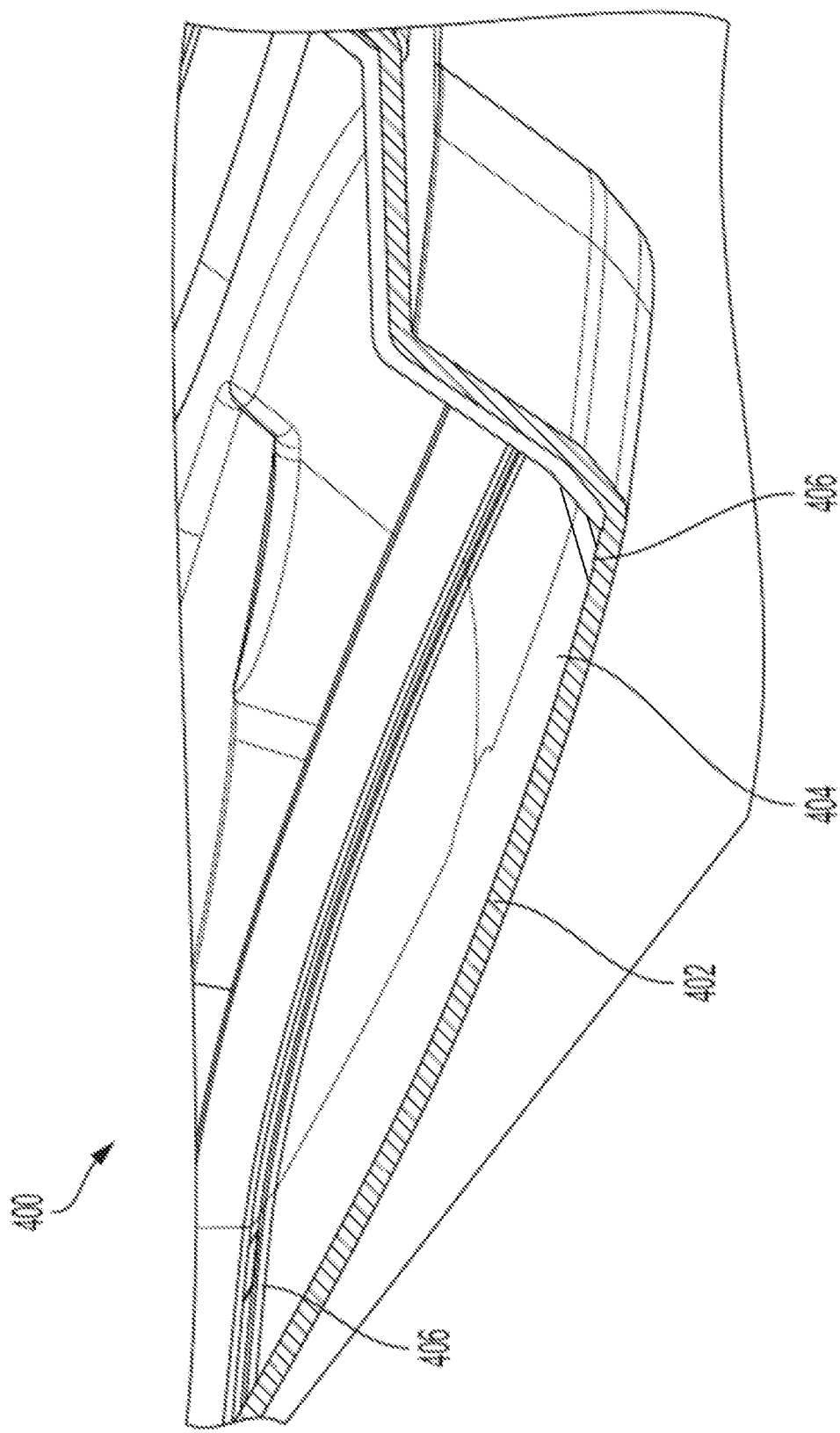
FIG. 4 depicts an example cross-sectional view of a portion of a headlamp, in accordance with some implementations.

FIG. 4 depicts an example headlamp 400, in accordance with some implementations. The headlamp 400 can be the same as or similar to the headlamp 206. The headlamp 400 can include a shell 402, a carbon nanotube layer 404, and a heating element 406. The shell 402 can be or include a material that is configured to house or otherwise hold a lens (e.g., the lens 208) in place. The lens can include the carbon nanotube layer 404 coupled or in contact with a layer of another material of the lens. The shell 402 can be a shell of a vehicle (e.g., the vehicle 105). The carbon nanotube layer 404 can be the same as or similar to the carbon nanotube layer 210. The heating element 406 can be a busbar, wire, or another conductor. The heating element 406 can be the same as or similar to the heating element 214. The heating element 406 can connect or couple with a battery (e.g., the battery 204) through one or more conductors or wires. The heating element 406 can contact (e.g., thermally couple) the carbon nanotube layer 404. The battery can discharge energy or current through the heating element 406. The heating element 406 can conduct the energy or current to the carbon nanotube layer 404. The carbon nanotube layer 404 can conduct the energy or current, causing the carbon nanotube layer 404 to heat up or otherwise increase in temperature. The carbon nanotube layer 404 can transfer heat to another layer of the lens, thus causing the lens to increase or decrease in temperature.

As shown in FIG. 4, the heating element 406 can include an elongated portion that surrounds or that is otherwise on the outside of the carbon nanotube layer 404. The heating element 406 can be located underneath the shell while contacting the carbon nanotube layer 404. Thus, the heating element 406 can contact the carbon nanotube layer 404 without blocking light from a lightbulb of the headlamp 400.

Figure 5:
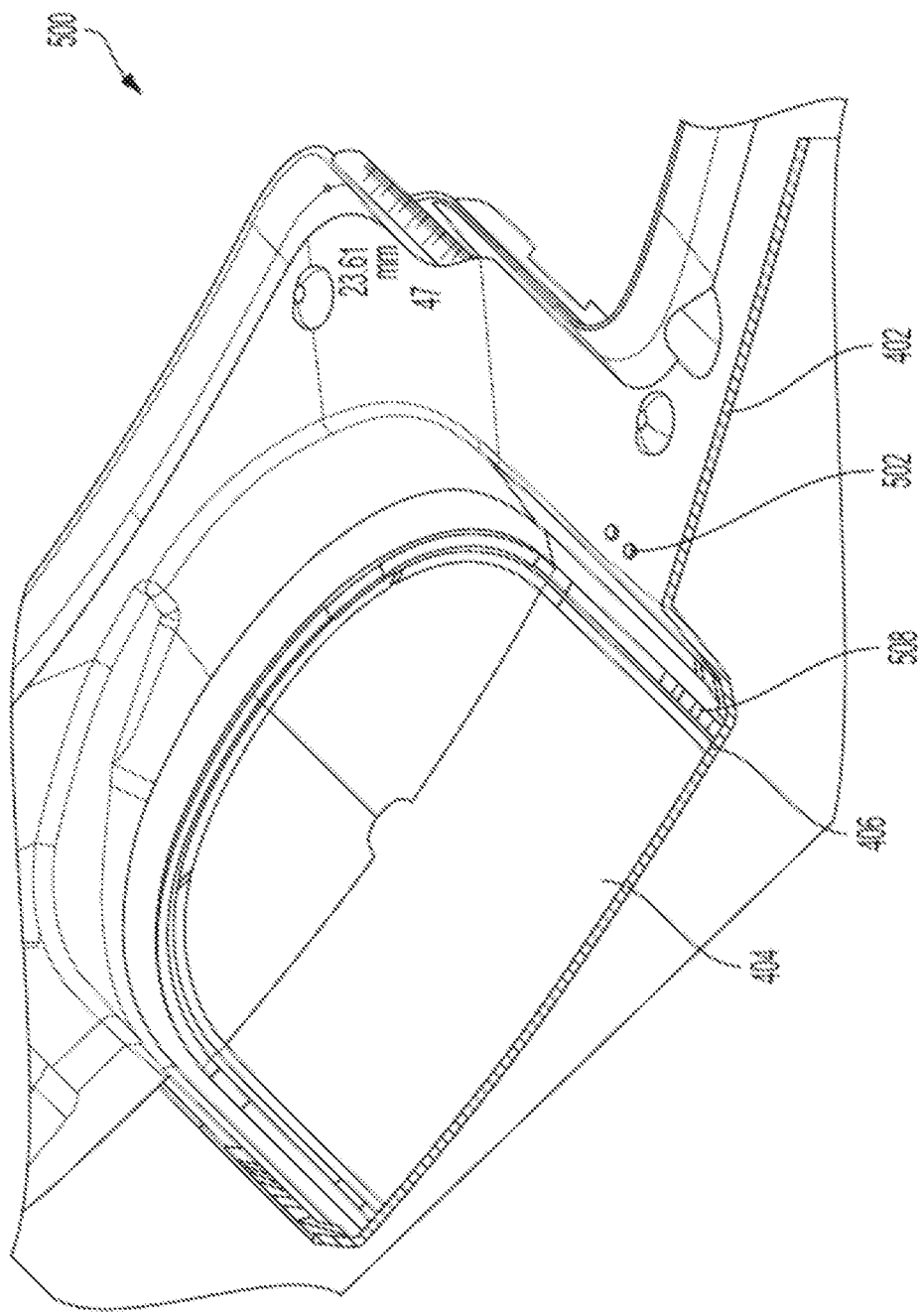
FIG. 5 depicts an example cross-sectional view of a portion of a headlamp, in accordance with some implementations.

FIG. 5 depicts the headlamp 400, in accordance with some implementations. As illustrated in FIG. 5, the headlamp 400 can include contact points 502 and traces 504. The contact points 502 and the traces 508 can be a part of the heating element 406. The contact points 502 can be configured to couple to the battery to receive energy or current. The energy or current can travel through the contact points 502 through the traces 508 to the heating element 406.

Figure 6:
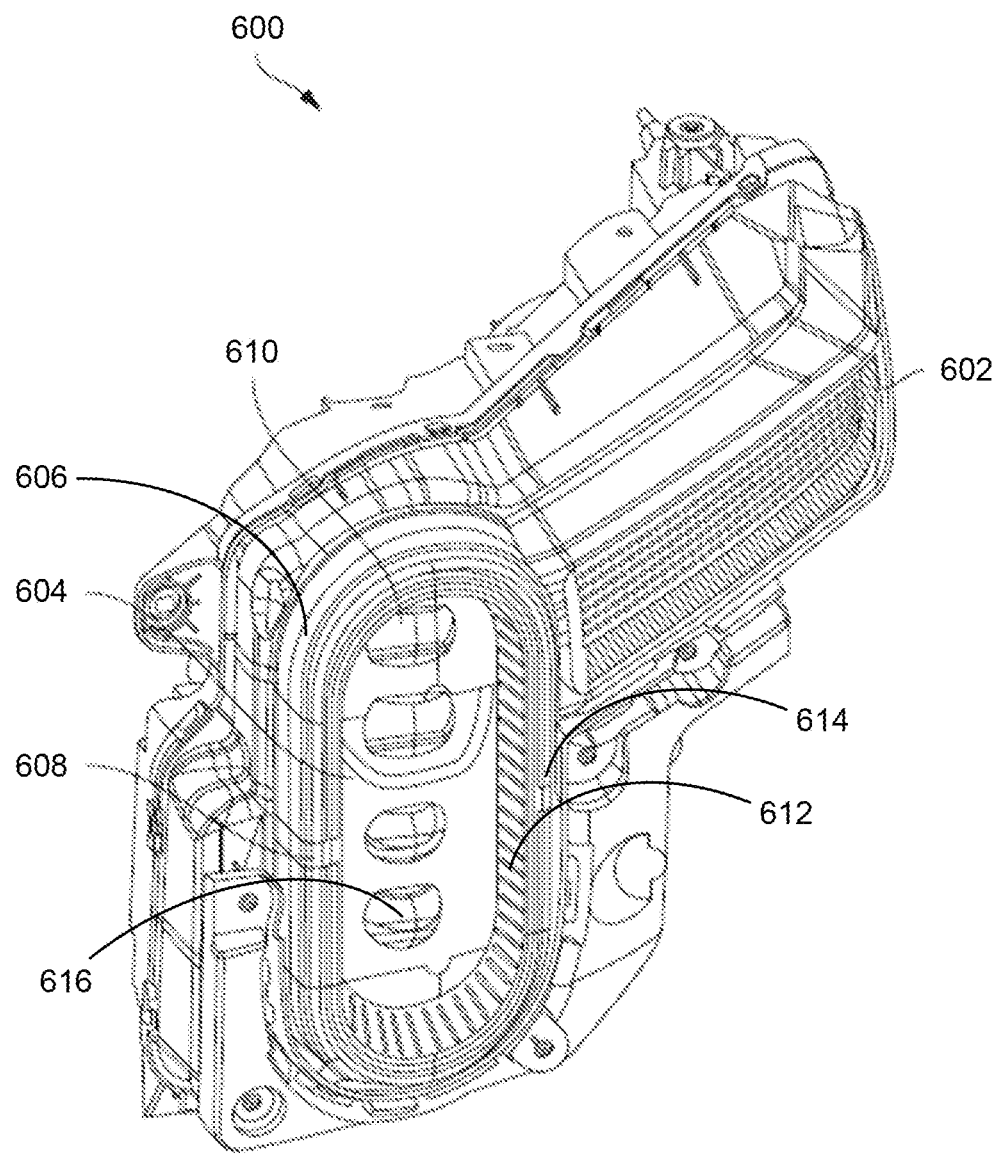
FIG. 6 depicts an example perspective view of a headlamp, in accordance with some implementations.

FIG. 6 depicts an example headlamp 600, in accordance with some implementations. The headlamp 600 can include a shell 602, a lens 604, and a stadium 606. The headlamp 600 can be affixed to a vehicle (e.g., the vehicle 105) through the shells 602. The stadium 606 can be stadium shaped. The stadium 606 can include a heating element 608, a bulb 610, and peripheral lights 612 (e.g., one or more peripheral lights). The headlamp 600 can be the same as or similar to the headlamp 400. The headlamp 600 can be the stadium 606 and the lens 604. The shell 602 can be a housing for the lens 604 and the stadium 606. The lens 604 can be a transparent material that includes at least one carbon nanotube layer. The lens 604 can be coupled or affixed with an outer edge 614 of the stadium 606. The heating element 608 can be coupled or affixed with the outer edge 614 of the stadium 606. The heating element 608 can be coupled or affixed to the lens 604 or the stadium 606 to surround the bulb 610. The heating element 606 can be connected or coupled (e.g., thermally coupled) with the carbon nanotube layer of the lens 604. The heating element 606 can transfer heat or electricity to the carbon nanotube layer. The carbon nanotube layer can transfer the heat to the other material of the lens 604, thus heating or modifying the heat of the lens 604. The bulb 610 can include multiple (e.g., four) lights 616 (e.g., additional lights). The lens 604 can be between the lights 616 and an environment surrounding a vehicle to which the headlamp 600 is coupled or attached. The lights 616 can emit light through the lens 604 to the environment.

Figure 7:
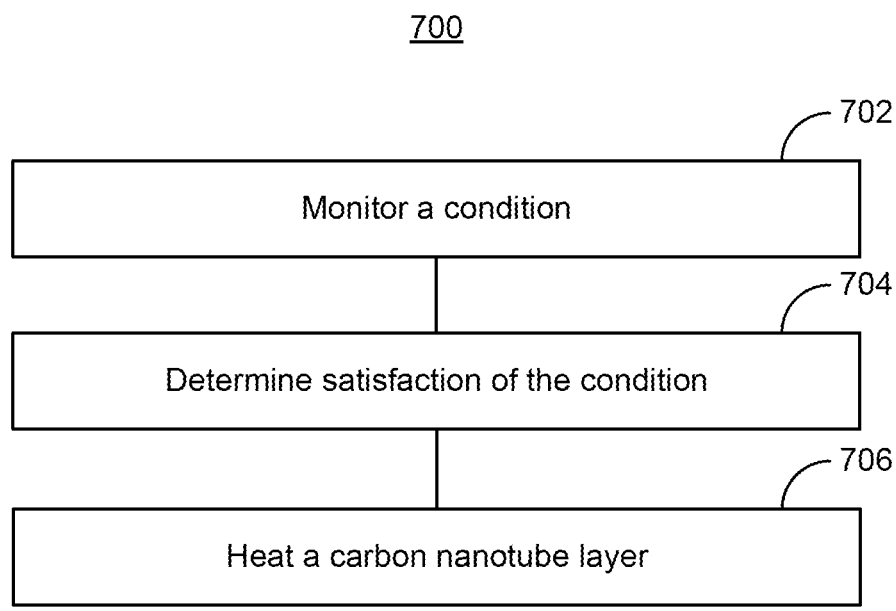
FIG. 7 depicts an example method for heating a lens, in accordance with some implementations.

FIG. 7 depicts an example method 700 for heating a lens, in accordance with some implementations. The method 700 can be performed by one or more components depicted in the system 200 or the controller 202 of FIG. 2. For example, the method 700 can be performed by a data processing system (e.g., the controller 202, shown and described with reference to FIG. 2). The method 700 can include monitoring a condition (ACT 702). The method 700 can include determining satisfaction of the condition (ACT 704). The method 700 can include heating a carbon nanotube layer (ACT 706).

At ACT 702, the method 700 can include monitoring a condition. The controller 202 can monitor conditions that the controller 202 has stored in memory. The conditions can correspond to values of different characteristics of an environment surrounding a vehicle or characteristics of a surface of the vehicle. The conditions can include one or more rules or thresholds. The controller 202 can receive values of the characteristics of the environment surrounding the vehicle or characteristics of the surface of the vehicle. The controller 202 can receive the values from sensors inside or otherwise attached to the vehicle that are configured to measure such values. The sensors can generate or measure the values of the different characteristics and transmit the measurements to the controller 202. The controller 202 can receive the measurements and compare the measurements to the conditions that correspond to the measurements.

At ACT 704, the method 700 can include determining satisfaction of the condition. The controller 202 can determine satisfaction of the condition based on a comparison between a measured value and the condition. For example, the controller 202 can receive a value of a precipitation content at a surface of the vehicle from a sensor. The controller 202 can compare the value to a threshold of the condition. The controller 202 can determine the condition is satisfied (e.g., satisfaction of the condition) responsive to the value exceeding the threshold. The controller 202 can similarly determine satisfaction of any other conditions.

At ACT 706, the method 700 can include heating a carbon nanotube layer. The carbon nanotube layer can be a layer of a lens. The lens can be integrated into the vehicle (e.g., the lens can be a lens of a headlamp, a break light, a turn signal, a windshield, or a mirror). The controller can heat the carbon nanotube layer responsive to satisfaction of the condition (e.g., responsive to determining satisfaction of the condition).

The controller 202 can heat the carbon nanotube layer of the lens through a battery coupled with the carbon nanotube layer. For example, the carbon nanotube layer can be coupled (e.g., thermally coupled) to or connected to a heating element (e.g., a wire or another other conductor). The battery can be connected to the heating element, such as through a wire or another conductor. The controller 202 can transmit a signal (e.g., a control signal) to the battery. The signal can cause the battery to discharge or direct current or energy through the heating element and the carbon nanotube layer. The energy or current can heat the carbon nanotube layer. The heat from the carbon nanotube layer can transfer to the other layers of the lens. Accordingly, the controller 202 can heat the carbon nanotube layer and lens by controlling the discharge of energy or current from the battery.

Figure 8:
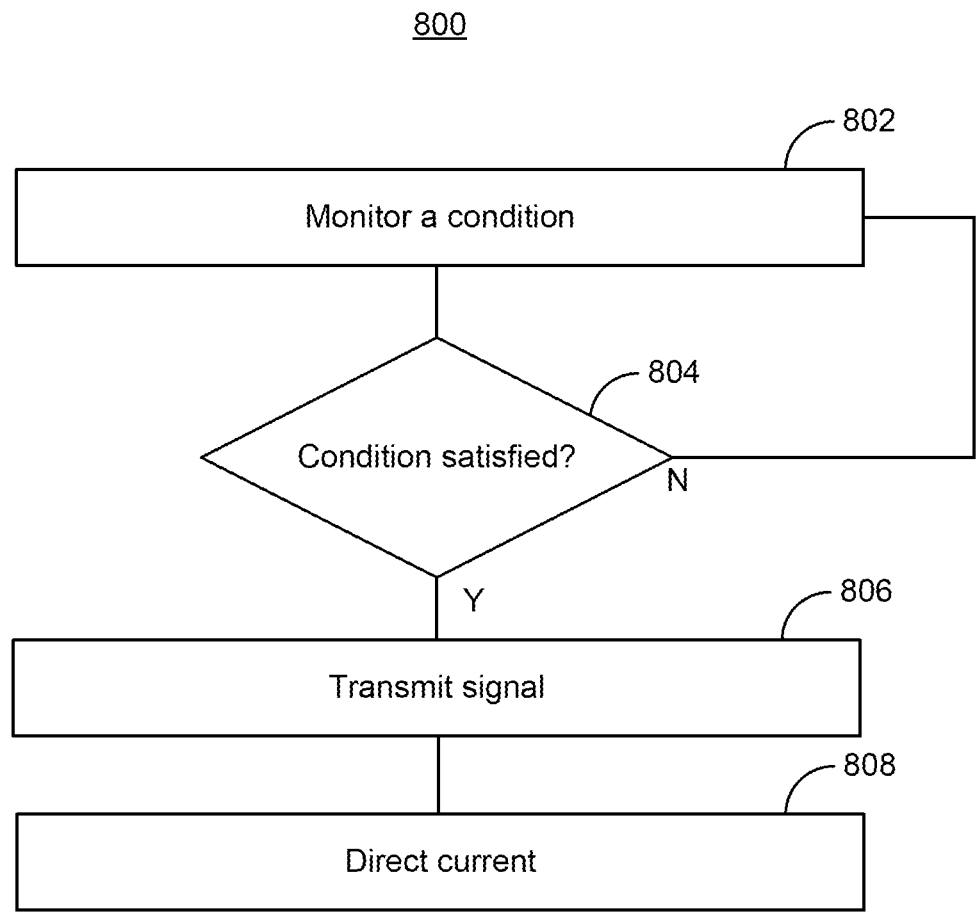
FIG. 8 depicts an example method for heating a lens, in accordance with some implementations.

FIG. 8 depicts an example method 800 for heating a lens, in accordance with some implementations. The method 800 can be performed by one or more components depicted in the system 200 or the controller 202 of FIG. 2. For example, the method 800 can be performed by a data processing system (e.g., the controller 202, shown and described with reference to FIG. 2). The method 800 can include monitoring a condition (ACT 802). The method 800 can include determining whether the condition is satisfied (ACT 804). The method 800 can include transmitting a signal (ACT 806). The method 800 can include directing current (ACT 808).

The method 800 can include monitoring loads (ACT 802). The controller 202 can monitor conditions that the controller 202 has stored in memory. The conditions can correspond to values of different characteristics of an environment surrounding a vehicle or characteristics of a surface of the vehicle. The conditions can include one or more rules or thresholds. The controller 202 can receive values of the characteristics of the environment surrounding the vehicle or characteristics of the surface of the vehicle. The controller 202 can receive the values from sensors inside or otherwise attached to the vehicle that are configured to measure such values. The sensors can generate or measure the values of the different characteristics and transmit the measurements to the controller 202. The controller 202 can receive the measurements and compare the measurements to the conditions that correspond to the measurements.

The method 800 can include determining whether any conditions are satisfied (ACT 804). The controller 202 can compare the measurements of the characteristics of the environment surrounding the vehicle or surface of the vehicle to the stored conditions. In doing so, the controller 202 can identify conditions that correspond to the different types of characteristics or measurements. The controller 202 can compare measurements to the corresponding identified conditions. Based on the comparisons, the controller 202 can determine if any of the conditions are satisfied. Responsive to determining none of the conditions are satisfied, the controller 202 can return to ACT 802. The controller 202 can repeat the ACTs 802 and 804 over time until determining at least one condition is satisfied based on a measured value of a characteristic of the environment surrounding the vehicle or the surface of the vehicle.

The method 800 can include transmitting a signal (ACT 806). The controller 202 can transmit the signal responsive to determining at least one condition is satisfied at ACT 804. The controller 202 can transmit a signal to the battery. The controller 202 can transmit the signal to the battery over a wired or wireless network. The signal can be a control signal that is configured to cause the battery 204 to discharge energy or current. The battery can receive the signal from the controller 202.

The method 800 can include directing current (ACT 808). The battery 204 can direct current or energy in response to receiving the signal from the controller 202. The battery can direct current or energy to a heating element. The heating element can be coupled (e.g., thermally coupled), attached, or contacting a carbon nanotube layer of a lens of the vehicle. The current or energy can travel through the heating element to or through the carbon nanotube layer. The current or energy can modify heat of (e.g., increase or decrease in temperature) the heating element or carbon nanotube layer. The increase in temperature of the carbon nanotube layer can cause the layers of the lens surrounding or otherwise contacting the carbon nanotube layer to increase or decrease in temperature. Thus, any precipitation on the lens can dissipate or slide off of the lens.

Figure 9:
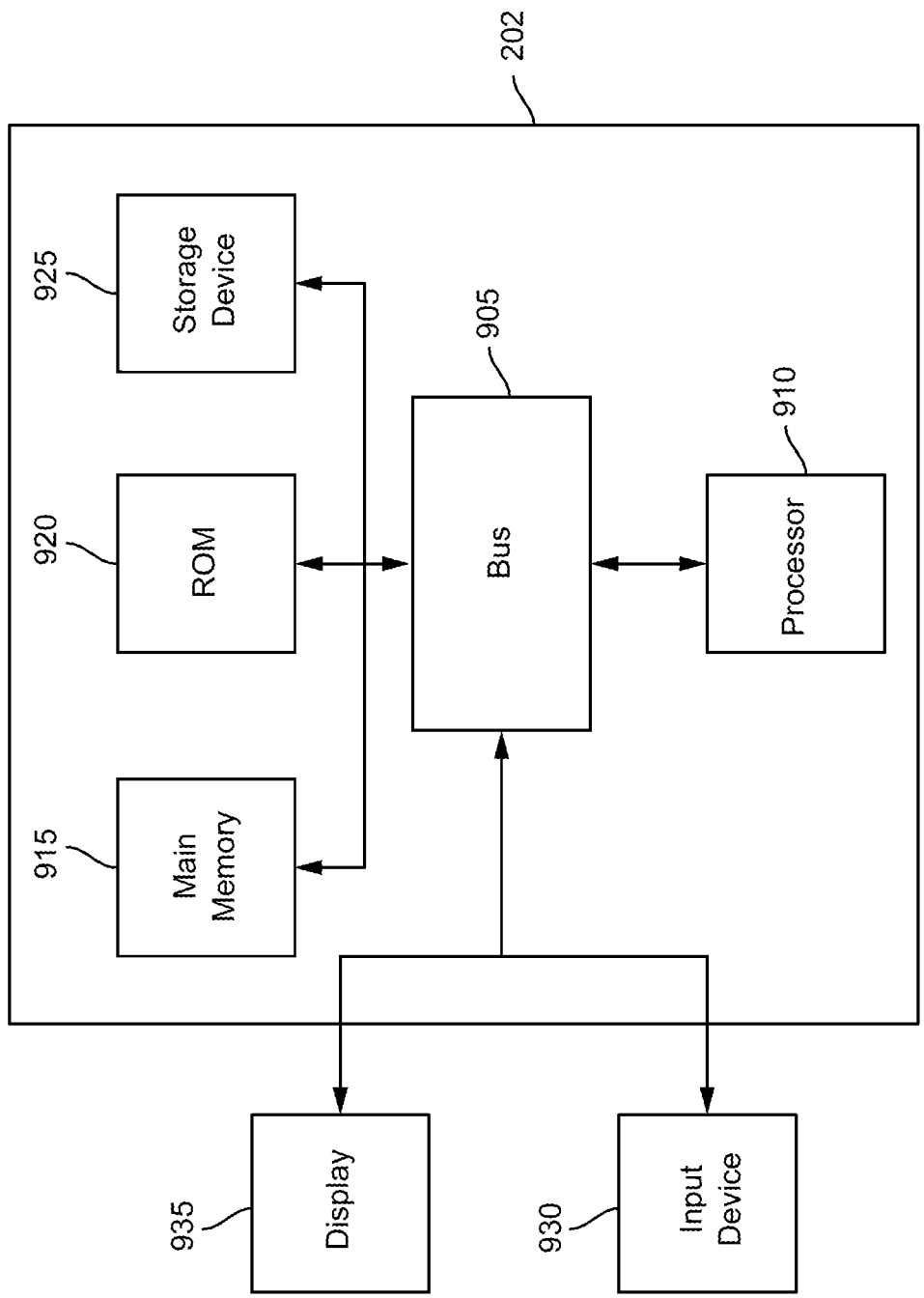
FIG. 9 is a block diagram illustrating an example architecture for a computer system that can be employed to implement elements of the systems and methods described and illustrated herein.

FIG. 9 depicts an example block diagram of the controller 202, in accordance with some implementations. The controller 202 can include or be used to implement an electronic control unit (e.g., a data processing system) or its components. The controller 202 can include at least one bus 905 or other communication component for communicating information and at least one processor 910 or processing circuit coupled to the bus 905 for processing information. The controller 202 can also include one or more processors 910 or processing circuits coupled to the bus for processing information. The controller 202 can also include at least one main memory 915, such as a random access memory (RAM) or other dynamic storage device, coupled to the bus 905 for storing information, and instructions to be executed by the processor 910. The main memory 915 can be used for storing information during execution of instructions by the processor 910. The controller 202 can further include at least one read only memory (ROM) 920 or other static storage device coupled to the bus 905 for storing static information and instructions for the processor 910. A storage device 925, such as a solid state device, magnetic disk or optical disk, can be coupled to the bus 905 to persistently store information and instructions.

The controller 202 can be coupled via the bus 905 to a display 935, such as a liquid crystal display, or active matrix display, for displaying information to a user such as a driver of the vehicle 105 or other end user. An input device 930, such as a keyboard or voice interface can be coupled to the bus 905 for communicating information and commands to the processor 910. The input device 930 can include a touch screen display 935. The input device 930 can also include a cursor control, such as a mouse, a trackball, or cursor direction keys, for communicating direction information and command selections to the processor 910 and for controlling cursor movement on the display 935.

The processes, systems and methods described herein can be implemented by the controller 202 in response to the processor 910 executing an arrangement of instructions contained in main memory 915. Such instructions can be read into main memory 915 from another computer-readable medium, such as the storage device 925. Execution of the arrangement of instructions contained in main memory 915 causes the controller 202 to perform the illustrative processes described herein. One or more processors in a multi-processing arrangement can also be employed to execute the instructions contained in main memory 915. Hard-wired circuitry can be used in place of or in combination with software instructions together with the systems and methods described herein. Systems and methods described herein are not limited to any specific combination of hardware circuitry and software.

Although an example computing system has been described in FIG. 9, the subject matter including the operations described in this specification can be implemented in other types of digital electronic circuitry, or in computer software, firmware, or hardware, including the structures disclosed in this specification and their structural equivalents, or in combinations of one or more of them.

Although an example computing system has been described in FIG. 9, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP. PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
a lens comprising a carbon nanotube layer and integrated into a headlamp of a vehicle, the headlamp comprising a shell to position the lens;
the carbon nanotube layer configured to thermally couple with a heating element coupled to the carbon nanotube layer at an outside edge of the lens to surround the lens at a location between the lens and the shell of the headlamp; and
the heating element to thermally couple with a busbar affixed to an outer surface of the shell of the headlamp.

2. The system of claim 1, comprising:
a thermocouple to monitor a temperature of the lens at a contact point between the busbar and the heating element; and
the heating element controlled based on the monitored temperature of the lens.

3. The system of claim 1, comprising:
a thermocouple to monitor a temperature of the carbon nanotube layer; and
the heating element is controlled based on the monitored temperature of the carbon nanotube layer.

4. The system of claim 1, comprising:
the carbon nanotube layer between a first layer comprising first polycarbonate and a second layer comprising second polycarbonate; and
the carbon nanotube layer is configured to modify heat of the first layer and the second layer by conducting current from the heating element.

5. The system of claim 1, comprising:
a controller to:
monitor a surface of a vehicle for precipitation; and
modify heat of the carbon nanotube layer in response to detection of precipitation on the surface.

6. The system of claim 1, comprising:
a controller to:
monitor an environment surrounding a vehicle; and
modify heat of the carbon nanotube layer in response to detecting precipitation in the environment.

7. The system of claim 1, comprising:
a controller to:
monitor a pressure at a surface of a vehicle; and
modify heat of the carbon nanotube layer in response to detection that the pressure at the surface of the vehicle exceeds a threshold.

8. The system of claim 1, comprising:
the headlamp comprising a stadium shape, and
the headlamp includes:
one or more peripheral lights, and
a plurality of additional lights.

9. The system of claim 1, comprising:
the headlamp including:
a plurality of lights, and
the lens between the plurality of lights and an environment surrounding the vehicle.

10. The system of claim 1, comprising:
a controller to modify heat of the carbon nanotube layer to cause the lens or the carbon nanotube layer to reach a predetermined temperature.

11. The system of claim 1, wherein the carbon nanotube layer is transparent to allow light to pass through the lens.

12. The system of claim 1, comprising:
the carbon nanotube layer between a first layer of polycarbonate and a second layer of polycarbonate;
a battery coupled with the carbon nanotube layer via a conductor;
the conductor contacting the carbon nanotube layer via the busbar affixed to the outer surface of the shell of the headlamp;
a controller coupled with the battery; and
the controller to cause the battery to heat the carbon nanotube layer through the conductor and the busbar.

13. A vehicle, comprising:
a lens, the lens comprising a carbon nanotube layer and integrated into a headlamp of a vehicle, the headlamp comprising a shell to position the lens; and
the carbon nanotube layer configured to thermally couple with a heating element coupled to the carbon nanotube layer at an outside edge of the lens to continuously surround the lens at a location between the lens and the shell of the headlamp; and
the heating element to thermally couple with a busbar affixed to an outer surface of the shell of the headlamp.

14. The vehicle of claim 13, comprising:
the carbon nanotube layer between a first layer comprising first polycarbonate and a second layer comprising second polycarbonate; and
the carbon nanotube layer is configured to modify heat of the first layer and the second layer by conducting current from the heating element.

15. The vehicle of claim 13, comprising:
a controller to:
monitor a characteristic of an environment surrounding the vehicle; and
modify heat of the carbon nanotube layer in response to determining the characteristic satisfies a condition.

16. The vehicle of claim 14, comprising:
a controller to:
monitor an environment surrounding a vehicle; and
modify heat of the carbon nanotube layer in response to detecting precipitation in the environment.

17. The vehicle of claim 13, comprising:
the headlamp includes:
a plurality of lights, and
the lens between the plurality of lights and an environment surrounding the vehicle.

18. A method, comprising:

monitoring, by a processor, a condition;

determining, by the processor, satisfaction of the condition;

responsive to the satisfaction of the condition, heating, by the processor, a carbon nanotube layer of a lens integrated into a headlamp of a vehicle, the headlamp comprising a shell to position the lens, by applying an electric current to a heating element coupled to the carbon nanotube layer at an outside edge of the lens to continuously surround the lens at a location between the lens and a shell of a vehicle, and the electric current applied to the heating element through a busbar affixed to an outer surface of the shell of the headlamp.

19. The method of claim 18, comprising:

transmitting, by the processor, a signal to a battery of the vehicle, the signal causing the battery to direct current through the carbon nanotube layer.

\* \* \* \* \*